United States Patent
Pryor (10) Patent No.: US 10,347,928 B2
(45) Date of Patent: Jul. 9, 2019

(54) AIR CONTROL SYSTEM AND METHOD FOR FUEL CELL STACK SYSTEM

(71) Applicant: Ford Global Technologies, LLC, Dearborn, MI (US)

(72) Inventor: Martin Pryor, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 261 days.

(21) Appl. No.: 15/158,650

(22) Filed: May 19, 2016

(65) Prior Publication Data

US 2017/0338500 A1    Nov. 23, 2017

(51) Int. Cl.
| | | |
|---|---|---|
| *H01M 8/04746* | (2016.01) | |
| *H01M 8/2457* | (2016.01) | |
| *H01M 8/04225* | (2016.01) | |
| *H01M 8/04302* | (2016.01) | |
| *H01M 8/04014* | (2016.01) | |

(Continued)

(52) U.S. Cl.
CPC ......... *H01M 8/04776* (2013.01); *B60L 58/32* (2019.02); *H01M 8/04014* (2013.01); *H01M 8/0432* (2013.01); *H01M 8/04067* (2013.01); *H01M 8/04111* (2013.01); *H01M 8/04225* (2016.02); *H01M 8/04268* (2013.01); *H01M 8/04302* (2016.02); *H01M 8/04395* (2013.01); *H01M 8/04619* (2013.01); *H01M 8/1018* (2013.01); *H01M 8/241* (2013.01); *H01M 8/2457* (2016.02); *H01M 2008/1095* (2013.01);
(Continued)

(58) Field of Classification Search
None
See application file for complete search history.

(56) References Cited

U.S. PATENT DOCUMENTS

| | | |
|---|---|---|
| 6,916,566 B2 | 7/2005 | Saloka et al. |
| 8,617,752 B2 | 12/2013 | Rainville et al. |

(Continued)

FOREIGN PATENT DOCUMENTS

CN    203071170 U    7/2013

OTHER PUBLICATIONS

Gurski, Stephen Daniel, Cold-start effects on performance and efficiency for vehicle fuel cell systems, Thesis submitted to the Faculty of Virginia Polytechnic Institute and State University, Dec. 19, 2002.

*Primary Examiner* — Lucas J. O'Donnell
(74) *Attorney, Agent, or Firm* — David B. Kelley; Brooks Kushman P.C.

(57) ABSTRACT

An airflow control method of an air control system for a fuel cell stack (FCS) includes opening a recirculation valve by a controller to recirculate air through a compressor to increase a temperature of the air prior to entering the FCS to offset a FCS temperature below a predetermined threshold in response to identification to a cold-start event. The recirculation valve may be arranged with the compressor to recirculate air therethrough. The FCS may be arranged with the compressor and recirculation valve to selectively receive air therefrom. A sensor may measure thermal conditions of the FCS. The controller may be programmed to receive signals from the sensor indicating thermal conditions of the FCS, and to operate the recirculation valve based on the signals to recirculate air through the compressor to increase a temperature of the air prior to entering the FCS.

7 Claims, 9 Drawing Sheets

(51) Int. Cl.
*H01M 8/04007* (2016.01)
*H01M 8/04111* (2016.01)
*H01M 8/04223* (2016.01)
*H01M 8/0432* (2016.01)
*H01M 8/0438* (2016.01)
*H01M 8/04537* (2016.01)
*H01M 8/1018* (2016.01)
*H01M 8/241* (2016.01)
*B60L 58/32* (2019.01)

(52) U.S. Cl.
CPC *H01M 2250/20* (2013.01); *H01M 2300/0082* (2013.01); *Y02T 90/32* (2013.01)

(56) References Cited

U.S. PATENT DOCUMENTS

| | | | |
|---|---|---|---|
| 8,875,531 B2 | 11/2014 | Park et al. | |
| 2005/0260466 A1* | 11/2005 | Kobayashi | H01M 8/04007 429/429 |
| 2014/0072895 A1* | 3/2014 | Becker | H01M 8/04089 429/444 |
| 2014/0120447 A1* | 5/2014 | Mussro | F04B 49/06 429/444 |
| 2014/0272649 A1 | 9/2014 | Hashim et al. | |
| 2014/0356750 A1* | 12/2014 | Zhang | H01M 8/04753 429/444 |
| 2015/0188161 A1 | 7/2015 | Kwon et al. | |

* cited by examiner

AIR CONTROL SYSTEM AND METHOD FOR FUEL CELL STACK SYSTEM

TECHNICAL FIELD

This disclosure relates to air circulation within a thermal management system of a fuel cell stack.

BACKGROUND

A vehicle, such as a fuel cell vehicle (FCV) or a fuel cell electric vehicle (FCEV), may contain an energy storage device, such as a fuel cell stack, to power components of the vehicle. The fuel cell stack may be integrated with systems to assist in managing vehicle performance and operations. The fuel cell stack may be used with a thermal management system to assist in managing thermal conditions of the fuel cell stack.

SUMMARY

An airflow control method of an air control system for a fuel cell stack (FCS) includes opening a recirculation valve by a controller to recirculate air through a compressor to increase a temperature of the air prior to entering the FCS to offset a FCS temperature below a predetermined threshold in response to identification to a cold-start event. The method may also include increasing a speed of the compressor during the recirculation of the air to further increase a temperature thereof. The compressor speed may be increased to a constant speed and an operational position of the recirculation valve may be varied such that a constant mass flow rate of air to the FCS is achieved. The operational position of the recirculation valve may be based on data from an accessible table corresponding to valve positions relative to FCS temperature settings. The increased compressor speed may be based on the data to increase the FCS temperature above the predetermined threshold. The method may include increasing a speed of the compressor corresponding to an additional power draw from the FCS to support the increased speed and to further increase the temperature of the FCS. The method may also include increasing a speed of the compressor based on detection of a mass flow rate of the air traveling to the FCS being below a predetermined flow threshold. The method may further include identifying the cold-start event as an event in which temperature conditions of the FCS are at or near freezing.

A FCS thermal management system includes a compressor, a recirculation valve, a FCS, a sensor, and a controller. The recirculation valve is arranged with the compressor to recirculate air therethrough. The FCS is arranged with the compressor and recirculation valve to selectively receive air therefrom. The sensor measures thermal conditions of the FCS. The controller is programmed to receive signals from the sensor indicating thermal conditions of the FCS, and to operate the recirculation valve based on the signals to recirculate air through the compressor to increase a temperature of the air prior to entering the FCS. The controller may be further programmed to open the recirculation valve based on detection of a compressor surge event. The controller may be further programmed to open the recirculation valve in response to receiving a signal from the sensor indicating a temperature of the FCS is below a predetermined threshold. The predetermined threshold may be a temperature corresponding to the FCS having an ice condition therein. The predetermined threshold may be a temperature corresponding to a cold-start event. The controller may be further programmed to close the recirculation valve in response to receiving a signal from the sensor indicating a temperature of the FCS is above a predetermined threshold. The controller may be further programmed to open the recirculation valve in response to receiving a temperature reading from the sensor indicating air within the FCS is below eighty degrees Celsius.

A fuel cell vehicle includes a FCS, an air control system, and a controller. The air control system includes a compressor and a recirculation valve in fluid communication with the FCS. The controller directs operation of the air control system and is programmed to, in response to detection of a cold-start event, open the recirculation valve to recirculate air through the compressor to increase a temperature of the air for delivery to the FCS. The vehicle may further include a sensor in communication with the controller to monitor thermal conditions of the FCS. The sensor may send a cold-start event detection signal to the controller in response to thermal conditions of the FCS being below a predetermined threshold. The predetermined threshold may be a temperature in which an ice condition occurs within a fuel cell of the FCS. The controller may be further programmed to increase a speed of the compressor in response to detection of the cold-start event to increase a load draw from the FCS. The controller may be further programmed to close the recirculation valve in response to detecting a temperature of the FCS being above a predetermined threshold. The predetermined threshold may include temperatures at or above eighty degrees Celsius.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
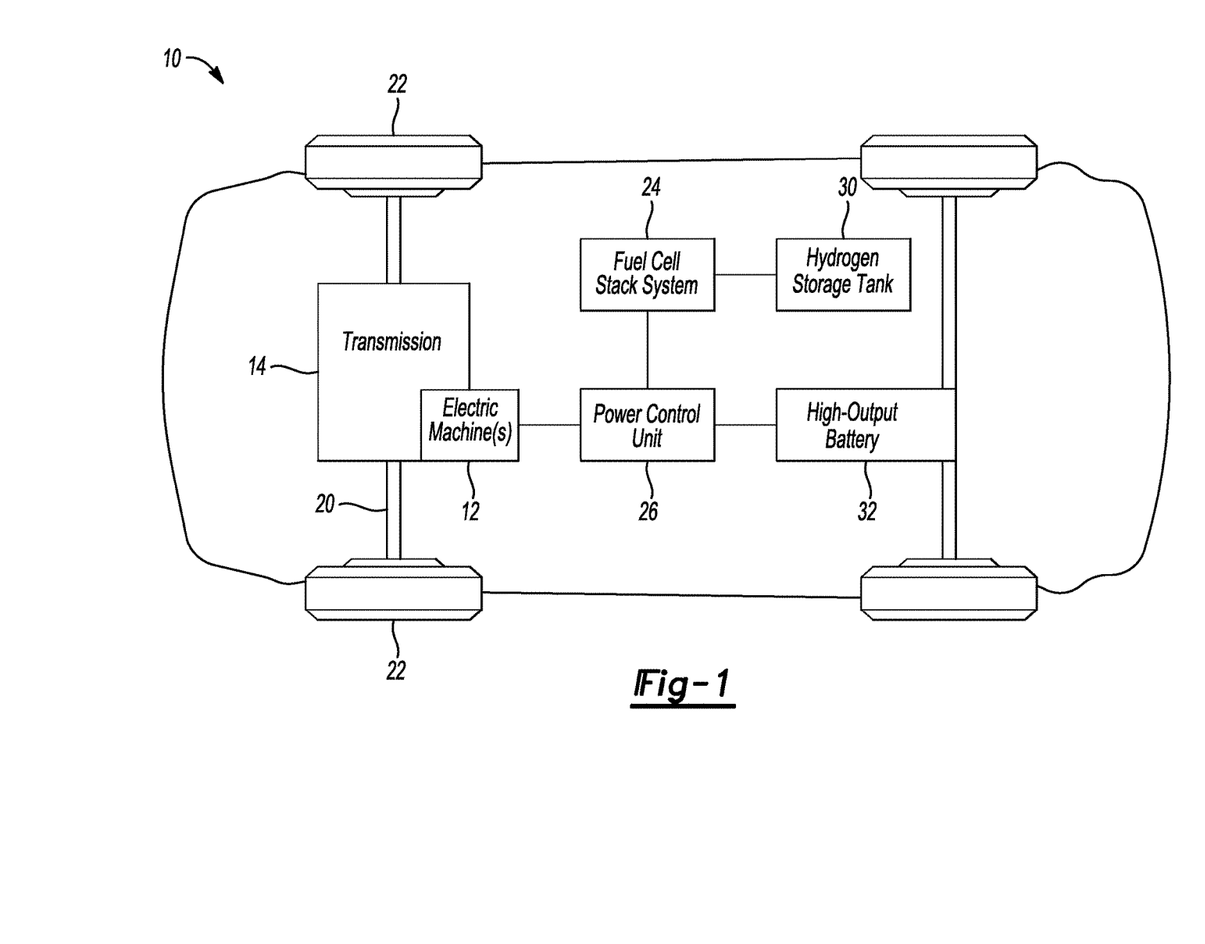
FIG. 1 is a schematic diagram depicting an example of a fuel cell vehicle.

FIG. 1 depicts a schematic diagram of an example of a fuel cell vehicle (FCV), referred to generally as a vehicle 10 herein. The vehicle 10 may include one or more electric machines 12 mechanically connected to a transmission 14. The electric machines 12 may be capable of operating as a motor or a generator. The transmission 14 may also be mechanically connected to a drive shaft 20 that is mechanically connected to a set of front wheels 22. The electric machines 12 may provide propulsion and deceleration capability. A fuel cell stack system 24 may generate electric current to power components of the vehicle 10. For example, a hydrogen delivery system may operate with the fuel cell stack system 24 to convert hydrogen gas and oxygen into electric current to power the electric machines 12. The electric current may be referred to as a load. The fuel cell stack system 24 may include one or more fuel cells making up a fuel cell stack, such as a polymer electrolyte membrane (PEM) fuel cell. The fuel cell stack system 24 may also include a thermal management system and/or an air flow control system. The thermal management system and/or the air flow control system may include, for example, a compressor. A power control unit 26 may govern a flow of electricity within the vehicle 10. For example, the power control unit 26 may govern the flow of electricity between the fuel cell stack system 24 and the electric machines 12. A hydrogen storage tank 30 may store hydrogen gas for use the fuel cell stack system 24. A high-output battery 32 may store energy generated from, for example, a regenerative braking system and may provide supplemental power to the electric machines 12.

The various components described above may have one or more associated controllers to control and monitor the operation of the components. The controllers may communicate via a serial bus (e.g., Controller Area Network (CAN)) or via discrete conductors.

Figure 2:
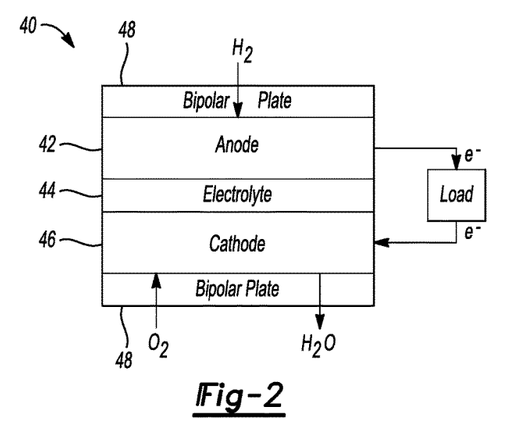
FIG. 2 is a schematic diagram depicting an example of a fuel cell.

FIG. 2 depicts a schematic diagram of an example of a PEM fuel cell, referred to generally as a PEM fuel cell 40 herein. The PEM fuel cell 40 is one example of a fuel cell which may operate in the fuel cell stack system 24 described above. The PEM fuel cell 40 may include an anode 42, an electrolyte 44, and a cathode 46. Chemical reactions may occur at interfaces between the anode 42, the electrolyte 44, and the cathode 46, respectively. For example, the anode 42 may receive a fuel, such as hydrogen, and oxidize the fuel to convert the fuel into a positively charged ion and a negatively charged electron. The electrolyte 44 may permit the ions to pass through to the cathode 46 while redirecting the electrons around the electrolyte 44 to create a load. The electrons may rejoin the ions within the cathode 46. The cathode 46 may receive a chemical, such as oxygen, to react with the ions and electrons to create, for example, water or carbon dioxide. Bipolar plates 48 may assist in distributing fuel and oxidant within the PEM fuel cell 40, facilitating water management with the PEM fuel cell 40, separating fuel cells within a fuel cell stack, and facilitating thermal management of the PEM fuel cell 40.

Air and water management relating to a system including a fuel cell, such as the PEM fuel cell 40, may affect a performance thereof. For example, electrodes of the fuel cell may be flooded by liquid water with excess hydration above a normal state which may cause fuel starvation, cell potential or current reversal, or corrosion of the electrodes and bipolar plates. In contrast, too little hydration may cause a higher resistance to proton transport in a membrane, e.g. an electrolyte, of the fuel cell and may facilitate radical scavenging of the membrane. S wings in a hydration state of the system may cause mechanical stresses in the membrane that may also lead to premature membrane failures. Fuel cell start-up and shut down conditions may also rely on water management and particularly under cold conditions. Under certain cold temperature conditions, water in the fuel cell, including water produced by the fuel cell during cold starts, may freeze presenting challenges during start-up. Control strategies may vary air circulation conditions during operation of the system by adjusting temperatures, flow rates, pressures, and electrical current draw to improve the performance and extend a life of the system.

Figure 3:
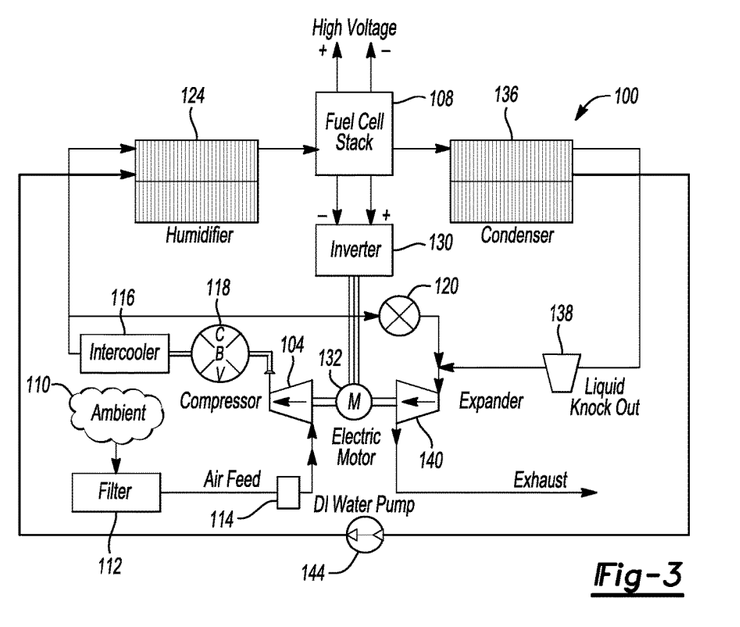
FIG. 3 is a schematic diagram depicting an example of a portion of an air control system of a fuel cell system.

FIG. 3 shows a schematic diagram of an example of a portion of a circulation circuit of an air control system for a fuel cell stack, referred to as an air control system 100 herein. The air control system 100 may include a compressor 104 positioned up stream of a fuel cell stack 108. Ambient cold air 110 may enter the air control system 100 via a filter 112. A mass air flow sensor 114 may measure an amount of air flowing therethrough. Air may flow from the compressor 104 to an intercooler 116 via a cathode blocking valve 118. A stack bypass valve 120 may divert a portion of the air flowing toward a humidifier 124 enroute to the fuel cell stack 108. As such, the mass air flow sensor 114 does not provide an accurate flow rate of air entering the fuel cell stack 108. The fuel cell stack 108 may transfer power to an inverter 130 enroute to an electric motor 132. The fuel cell stack 108 may also output high voltage power for other vehicle components. A mixture of elements, such as oxygen depleted air, water vapor, and liquid water, exiting the fuel cell stack 108 may pass through a condenser 136 enroute to a liquid knock out 138. The liquid knock out 138 may assist in removing liquid included in the mixture of elements. The remaining portions of the mixture of elements may then travel through an expander 140 enroute to exiting the air control system 100. A de-ionized water pump 144 may assist in transferring water from the condenser 136 to the humidifier 124. The air control system 100 may face operational challenges during a cold-start event due to a temperature of air entering the fuel cell stack 108 and due to the temperature of the fuel cell stack 108.

Figure 4A:
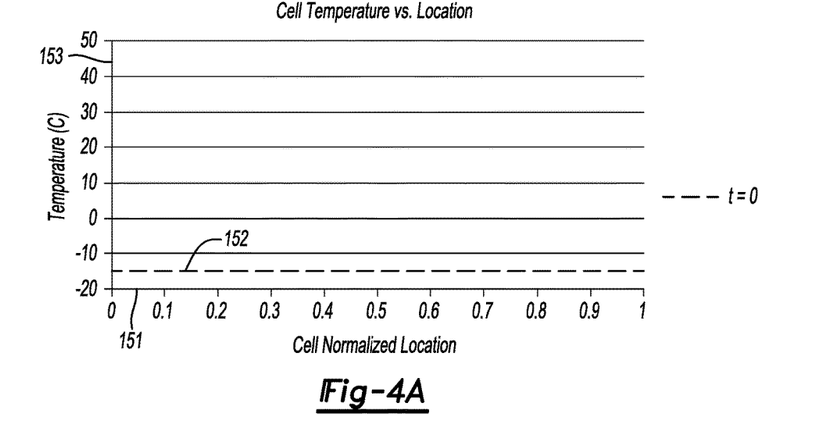
FIGS. 4A through 4H are graphical representations of an example of temperature conditions within a fuel cell during a cold-start event.
Figure 4B:
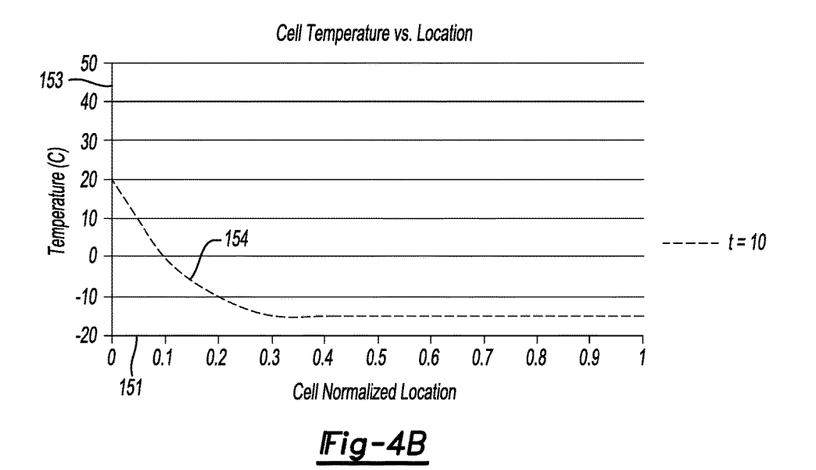
Figure 4C:
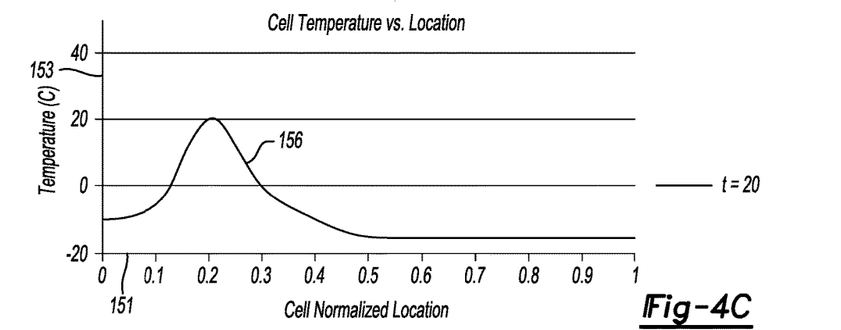
Figure 4D:
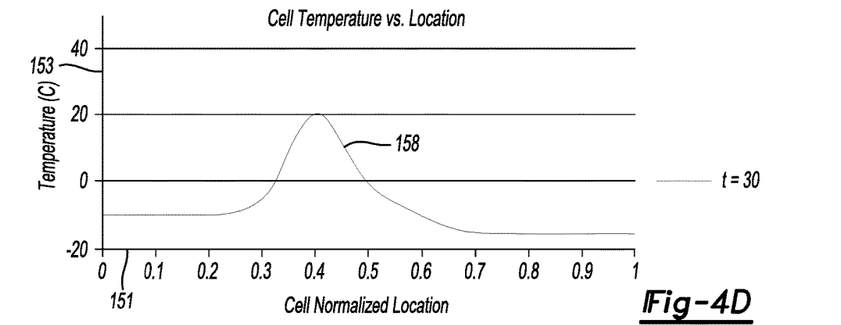
Figure 4E:
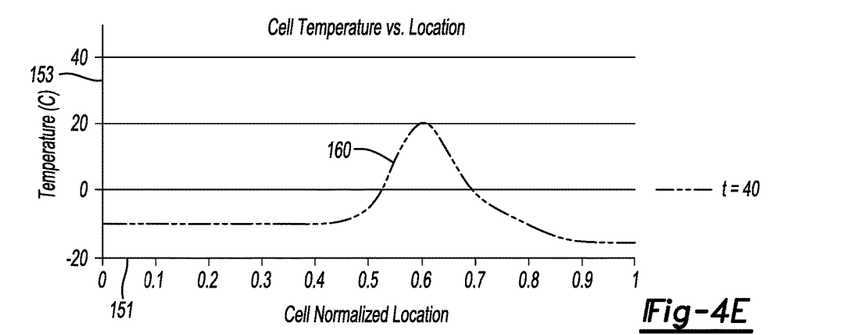
Figure 4F:
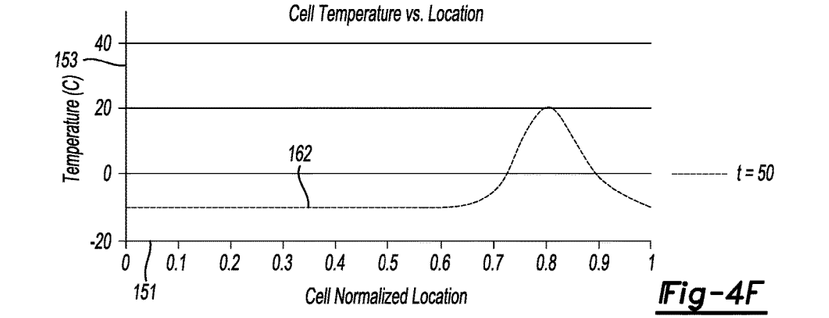
Figure 4G:
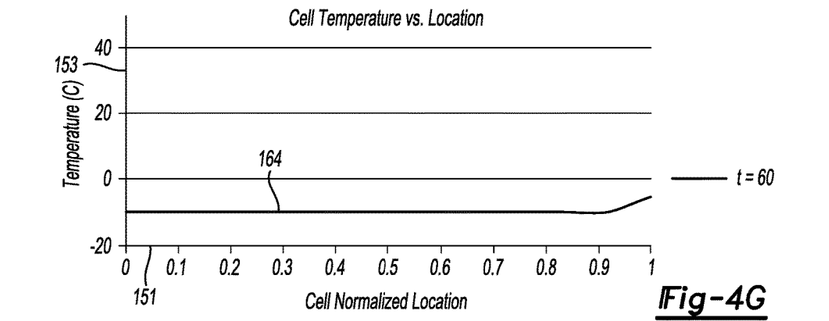
Figure 4H:
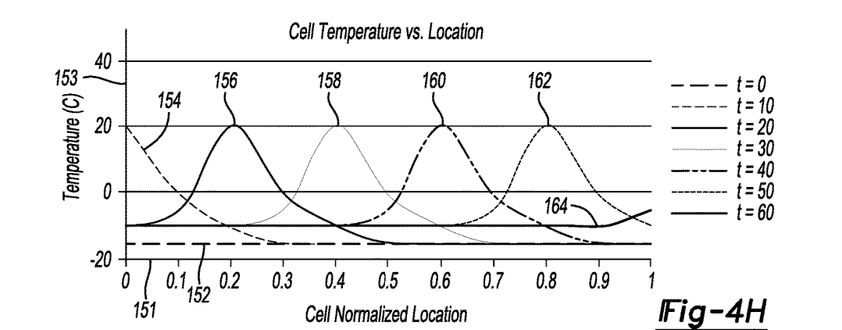

FIGS. 4A through 4H show a graphic example of temperature within a fuel cell of the fuel cell stack 108 upon receiving cold air at a given time after a cold-start. An X-axis 151 represents a distance from an inlet of the fuel cell and a Y-axis 153 represents temperature of the fuel cell's active area. In this example, coolant, air and hydrogen enter from the left side in the plots. As water is generated from power production of the fuel cell, cold coolant entering from the left freezes the product water starting at the left (a location where the coolant would be coldest). The frozen water blocks reaction sites preventing further power generation at the reaction sites. Due to a constant power load on the fuel cell during the cold-start event, current density and therefore temperatures, increase for the remaining unfrozen active area to keep total power generation constant. The plots in FIGS. 4A through 4H show the active area of the fuel cell. However, the fuel cells have a frame surrounding the active area. A drop off along the edges, which results in a peak near the center, is due to a thermal mass of the frame surrounding the active area of the fuel cell. The frame is cold and draws heat away from the active area. Hence the drop off in temperature to the right of the peak. In an extreme case, the entire active area will be frozen preventing any power generation. In this case, the system will not start until it is thawed. For example, FIG. 4A relates to a temperature conditions at zero seconds represented by a temperature plot 152. FIG. 4B relates to temperature conditions at ten seconds represented by a temperature plot 154. FIG. 4C relates to temperature conditions at twenty second represented by a temperature plot 156. FIG. 4D relates to temperature conditions at thirty seconds represented by a temperature plot 158. FIG. 4E relates to temperature conditions at forty seconds represented by a temperature plot 160. FIG. 4F relates to temperature conditions at fifty seconds represented by a temperature plot 162. FIG. 4G relates to temperature conditions at sixty seconds represented by a temperature plot 164. FIG. 4H shows a comparison of temperature conditions at each of the time intervals from FIGS. 4A through 4G. Air entering the inlet on an inlet side of the fuel cell may result in an ice condition at a portion of the fuel cell due to limited heat available to increase a temperature thereof. Temperatures which may negatively impact fuel cell performance include temperatures near or below freezing. For example, the fuel cell may include water which may be frozen do to external temperatures or may become frozen due to introduction of the cold air. This ice condition may slow the start or under certain conditions, prevent the start all together. Adjusting a circulation of air to the compressor to increase a temperature of the air is one example of a strategy to reduce or eliminate the ice condition occurring at or during a vehicle cold-start.

Figure 5:
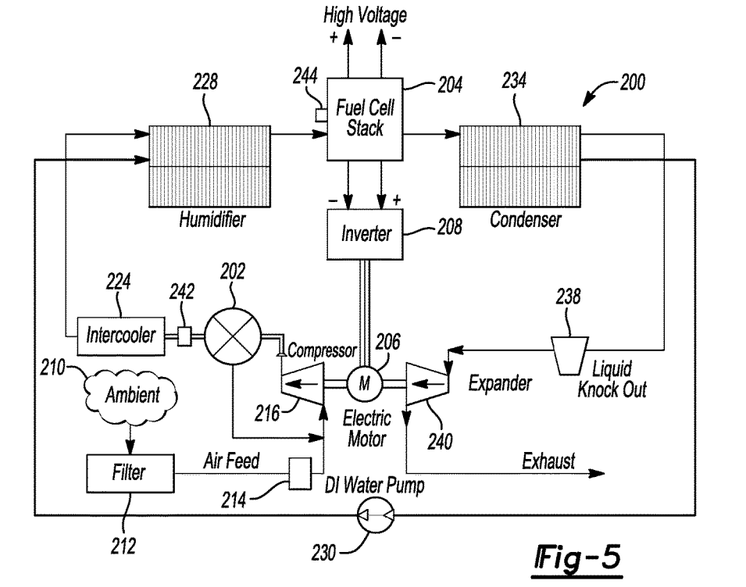
FIG. 5 is a schematic diagram depicting an example of a portion of an air control system of a fuel cell system.

FIG. 5 shows an example of an air control system for a fuel cell stack, referred to as an air control system 200 herein. In contrast to the air control system 100, the air control system 200 includes a recirculation valve 202 and does not include a stack bypass valve. The air control system 200 operates to assist in managing thermal conditions of a fuel cell stack 204. The fuel cell stack 204 may be in communication with an electric motor 206 via an inverter 208. The fuel cell stack 204 may output high voltage for operation of vehicle components. Ambient air 210 may enter the air control system 200 via a filter 212. A mass air flow sensor 214 may be disposed between the filter 212 and a compressor 216. The mass air flow sensor 214 may measure a flow rate of air traveling within the air control system 200 and to the fuel cell stack 204.

The recirculation valve 202 may recirculate air from an outlet of the compressor 216 to an inlet of the compressor 216. The recirculation valve 202 may be arranged with the compressor 216 to increase a temperature of air flowing therethrough. The recirculation valve 202 may be internal or external to the compressor 216. Decreasing a length of conduit between the recirculation valve 202 and the compressor 216 may further increase a temperature of the air flowing therethrough. In contrast to an air control configuration including a stack bypass valve, such as the stack bypass valve 120 included in the air control system 100, the mass air flow sensor 214 in this example will provide more accurate readings of an amount of air flow received by the fuel cell stack 204 since there is no bypass valve diverting a portion of the air away from the fuel cell stack 204.

An intercooler 224 may be disposed down-stream of the recirculation valve 220. The intercooler 224 may contain liquid coolant to manage thermal conditions of entering air which has been compressed by the compressor 216. For example, air entering the intercooler 224 may be of a temperature of one hundred degrees Celsius and a desired temperature of air for introduction to the fuel cell stack 204 may be approximately eighty degrees Celsius. Optionally, the intercooler 224 may be turned off, such as during a cold-start event. Air may pass from the intercooler 224 to a humidifier 228. The humidifier 228 may manage a moisture content of the air prior to entering the fuel cell stack 204. For example, water may be delivered to the humidifier 228 at a direction of a de-ionized water pump 230. Optionally, the humidifier 228 may be turned off under certain conditions, such as a cold-start event. The fuel cell stack 204 distributes a mixture of elements to a condenser 234 following energy generation within the fuel cell stack 204. The mixture of elements may include oxygen depleted air, water vapor, and liquid water. Portions of the mixture of elements reduced to a liquid form within the condenser 234 and then dispersed from the system via a liquid knock out 238 or redirected back to the humidifier 228 as directed by the de-ionized water pump 230. A remaining portion of the mixture of elements travels to an expander 240 and/or an exhaust throttle valve prior to exhaustion from the air control system 200.

One or more sensors may be located throughout the air control system 200 to provide information relating to thermal conditions to a controller. The controller may be in communication with the components of the air control system 200 to direct operation thereof. For example, the controller may be in electrical communication with the one or more sensors to receive signals therefrom. A first sensor 242 may be located between the recirculation valve 202 and the intercooler 224. The first sensor 242 may send signals to the controller indicating, for example, a temperature or flow rate of the air traveling from the recirculation valve 202. A second sensor 244 may be located between the humidifier 228 and the fuel cell stack 204. The second sensor 244 may send signals to the controller indicating, for example, a temperature or flow rate of the air traveling to the fuel cell stack 204. The controller may be programmed to direct operation of the recirculation valve 202 based on signals received from the first sensor 242 and the second sensor 244. For example, the controller may be programmed to direct operation of the recirculation valve 202 to recirculate air through the compressor 216 based on thermal conditions detected by the first sensor 242 and the second sensor 244 to warm air enroute to the fuel cell stack 204. The controller may be programmed to direct operation of the recirculation valve 202 to incrementally open or close based on thermal conditions detected by the first sensor 242 and the second sensor 244 to warm air enroute to the fuel cell stack 204.

Figure 6A:
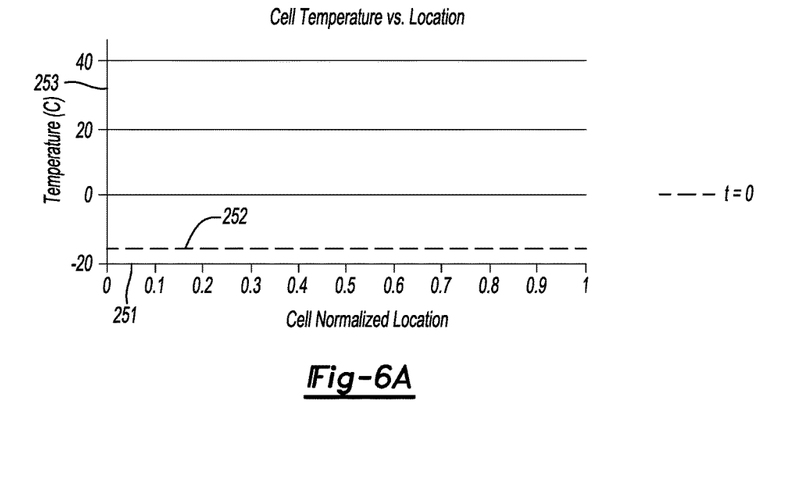
FIGS. 6A through 6H are graphical representations of another example of temperature conditions within a fuel cell during a cold-start event.
Figure 6B:
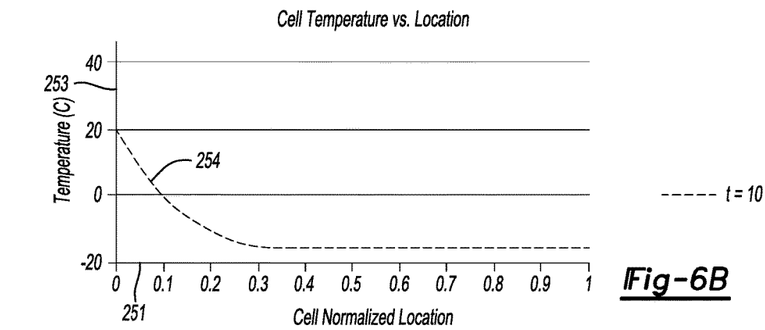
Figure 6C:
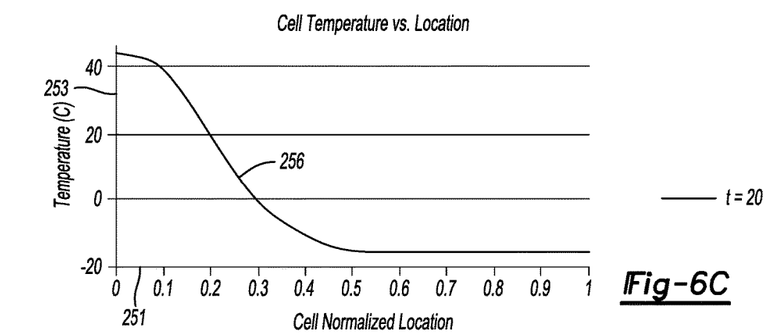
Figure 6D:
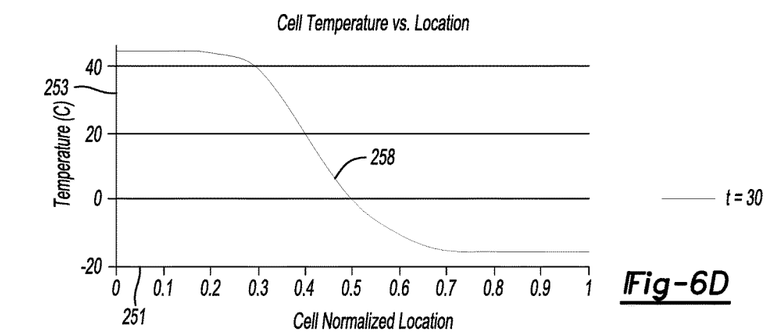
Figure 6E:
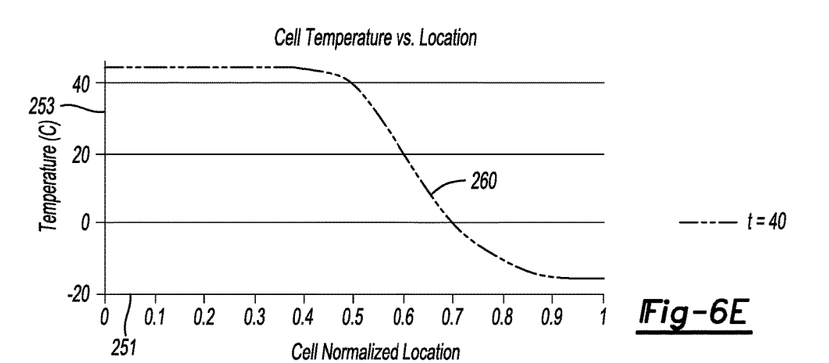
Figure 6F:
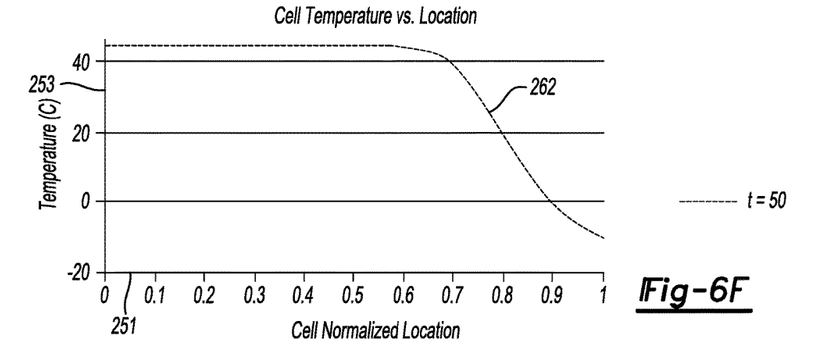
Figure 6G:
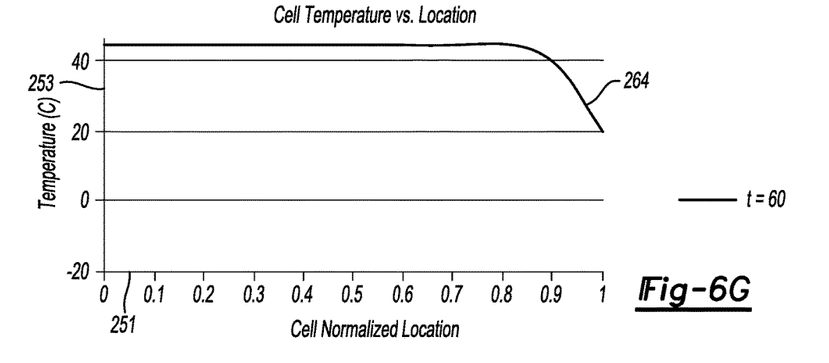
Figure 6H:
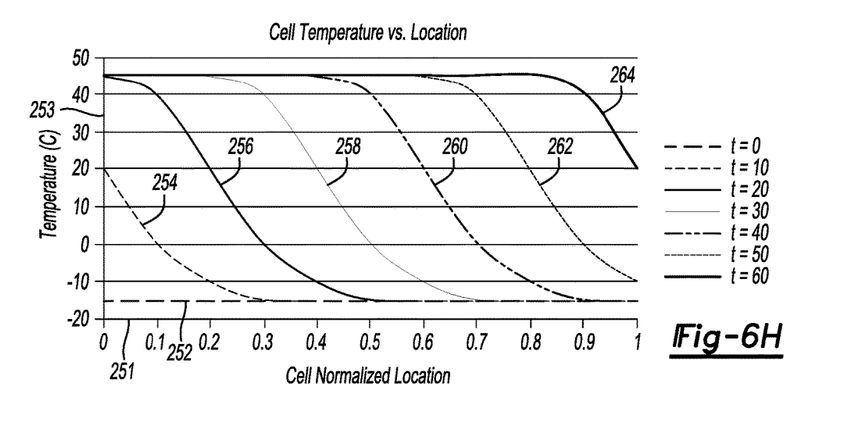

FIGS. 6A through 6H show a graphic representation of an example of temperature conditions within a fuel cell of the fuel cell stack 204 under which the fuel cell is receiving air following a recirculation through a compressor, such as a recirculation of air through the compressor 216 via the recirculation valve 202. Similar to FIGS. 4A through 4H, a X-axis 251 represents the distance from an inlet of the fuel cell and a Y-axis 253 represents temperature. Air entering the inlet on an inlet side of the fuel cell is warmer in comparison to the scenario depicted in FIGS. 4A through 4H due to the recirculation through the compressor. For example, the air may be at a temperature at or near eighty degrees Celsius. In this example, the fuel cell of the fuel cell stack 204 is shown having higher temperatures at each of the time intervals in comparison to the fuel cell of the fuel sell stack 108. The higher temperature within the fuel cell of the fuel cell stack 204 will positively impact performance thereof. As shown in FIGS. 6A through 6H, adjusting a circulation of air to the compressor 216 results in a delivery of warmer air to the fuel cell and eliminates possible ice conditions. For example, FIG. 6A relates to a temperature conditions at zero seconds represented by a temperature plot 252. FIG. 6B relates to temperature conditions at ten seconds represented by a temperature plot 254. FIG. 6C relates to temperature conditions at twenty second represented by a temperature plot 256. FIG. 6D relates to temperature conditions at thirty seconds represented by a temperature plot 258. FIG. 6E relates to temperature conditions at forty seconds represented by a temperature plot 260. FIG. 6F relates to temperature conditions at fifty seconds represented by a temperature plot 262. FIG. 6G relates to temperature conditions at sixty seconds represented by a temperature plot 264. FIG. 6H shows a comparison of temperature conditions at each of the time intervals from FIGS. 6A through 6G.

Figure 7:
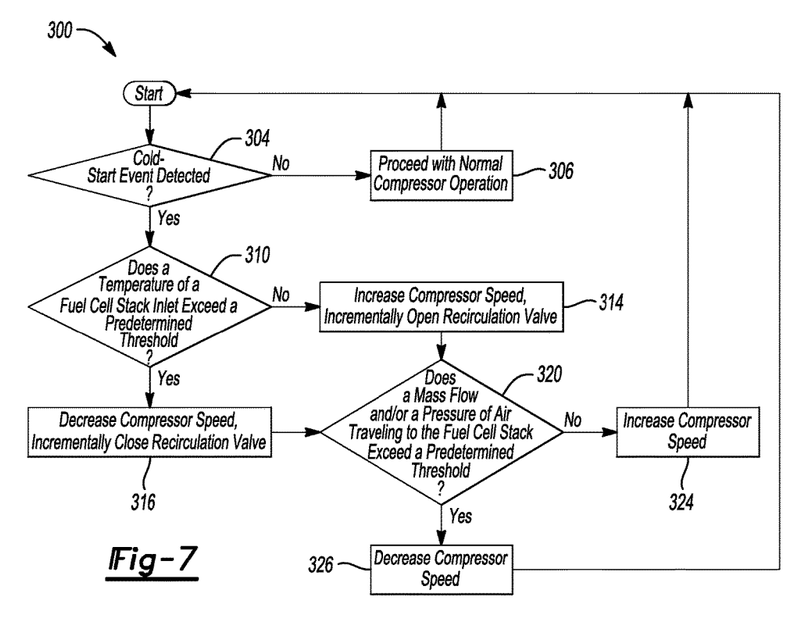
FIG. 7 is a flow chart illustrating an example of an algorithm for operation of an air control system of a fuel cell stack.

FIG. 7 shows an example of an algorithm for a control strategy of an air control system, such as the air control system 200, referred to generally as an algorithm 300. In operation 304, a controller may determine whether a cold-start event has occurred. For example, one or more sensors of the air control system may send signals to the controller relating to thermal conditions of components of the air control system. In the event a sensor of the one or more sensors does not detect a cold-start event, the controller may direct the compressor to operate normally in operation 306. In the event a sensor of the one or more sensors indicates occurrence of a cold-start event, the controller may then check a fuel cell stack sensor to determine if a temperature of the fuel cell stack is above or below a predetermined threshold in operation 310. An example of the predetermined threshold may include temperatures at or below normal operating temperature, such as eighty degrees Celsius, for quicker warm up, or below freezing in the case of a cold-start.

In the event that the fuel cell stack sensor indicates the temperature of the fuel cell stack is below the predetermined threshold, the controller may direct a compressor of the air control system to increase speed and direct a recirculation valve to open or incrementally open in operation 314. The recirculation valve may be in a location relative to the compressor such that recirculation valve may divert air exiting an outlet of the compressor to an inlet of the compressor. Optionally, the recirculation valve and the compressor may be a single component. As the air is recirculated through the compressor the air may increase in energy and as a result, increase in temperature to provide warmer air to the fuel cell stack. In the event that the fuel cell stack sensor indicates the temperature of the fuel cell stack is above the predetermined threshold, the controller may direct the compressor to decrease speed and close or incrementally close the recirculation valve in operation 316.

In operation 320, a sensor may measure a mass flow rate and/or a pressure of air traveling from the compressor to the fuel cell stack. In the event that the mass flow rate and/or pressure is below a predetermined flow threshold, the controller may direct the compressor to increase speed. In the event that the mass flow rate and/or pressure is above the predetermined flow threshold, the controller may direct the compressor to decrease speed. This arrangement provides for the compressor to run at a higher speed with a higher flow rate while the fuel cell stack only receives air at a flow rate preferable for optimal performance. Further, as the compressor increases speed, additional power consumption results which will also direct the fuel cell stack to work harder and generate more internal heat to assist in facilitating a quicker warm-up. The predetermined flow threshold may be based on an optimal flow rate and an optimal pressure of the system for the fuel cell stack to operate at a desired performance level.

While described in an environment for a vehicle, the air control system embodiments described herein may also be utilized with stationary electrical power generation, aircraft, or other applications including an air control system and fuel cell stack.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A fuel cell stack (FCS) system comprising:
 a compressor in fluid communication with an FCS;
 a recirculation valve arranged in direct fluid communication, without fluid flow diversion, with the compressor to recirculate all air traveling through the compressor for warming prior to entering the FCS;
 a sensor located proximate the FCS; and
 a controller programmed to operate the valve based on sensor signals indicating air temperature is below a first threshold.

2. The system of claim 1, wherein the controller is further programmed to open the valve based on detection of a compressor surge event.

3. The system of claim 1, wherein the controller is further programmed to open the valve in response to receiving a signal from the sensor indicating a temperature of the FCS is below a second threshold.

4. The system of claim 3, wherein the second threshold is a temperature corresponding to the FCS having an ice condition therein.

5. The system of claim 3, wherein the second threshold is a temperature corresponding to a cold-start event.

6. The system of claim 1, wherein the controller is further programmed to close the valve in response to receiving a signal from the sensor indicating a temperature of the FCS is above a third threshold.

7. The system of claim 1, wherein the controller is further programmed to open the valve in response to receiving a temperature reading from the sensor indicating air within the FCS is below eighty degrees Celsius.

* * * * *